(12) United States Patent
Hsu

(10) Patent No.: US 10,308,308 B2
(45) Date of Patent: Jun. 4, 2019

(54) BICYCLE FRAME

(71) Applicant: A-Pro Tech Co., Ltd., Taichung (TW)

(72) Inventor: Shun-Min Hsu, Guosing Township (TW)

(73) Assignee: A-Pro Tech Co., Ltd., Taichung (TW)

( * ) Notice: Subject to any disclaimer, the term of this patent is extended or adjusted under 35 U.S.C. 154(b) by 121 days.

(21) Appl. No.: 15/709,887

(22) Filed: Sep. 20, 2017

(65) Prior Publication Data

US 2018/0086410 A1 Mar. 29, 2018

(30) Foreign Application Priority Data

Sep. 23, 2016 (TW) .............................. 105130724 A

(51) Int. Cl.
- *B62K 19/36* (2006.01)
- *B62J 1/08* (2006.01)
- *B62K 19/18* (2006.01)

(52) U.S. Cl.
CPC ................. *B62K 19/36* (2013.01); *B62J 1/08* (2013.01); *B62K 19/18* (2013.01); *B62K 2201/02* (2013.01)

(58) Field of Classification Search
CPC ............. B62K 19/36; B62K 19/18; B62J 1/08
See application file for complete search history.

(56) References Cited

U.S. PATENT DOCUMENTS

| | | | | |
|---|---|---|---|---|
| 4,772,153 A * | 9/1988 | Huang | ................... | B62K 19/18 403/344 |
| 4,957,388 A * | 9/1990 | Liu | ........................ | B62K 19/36 403/272 |
| 5,618,052 A * | 4/1997 | Rendall | ...................... | B62J 1/08 280/288.4 |
| 5,979,978 A * | 11/1999 | Olsen | ......................... | B62J 1/08 297/195.1 |
| 8,448,971 B2 * | 5/2013 | Giroux | ................... | B62H 5/006 280/287 |
| 9,056,646 B1 * | 6/2015 | D'Aluisio | .............. | B62K 19/30 |
| 9,481,419 B2 * | 11/2016 | Bettin | ...................... | B62J 1/007 |
| 9,963,188 B2 * | 5/2018 | Gauthier | ................ | B62K 19/08 |
| 2004/0245744 A1 * | 12/2004 | Emang | ....................... | B62J 1/00 280/281.1 |
| 2010/0199481 A1 * | 8/2010 | Petrie | ......................... | B62J 1/08 29/428 |
| 2012/0104727 A1 * | 5/2012 | Hsu | ............................ | B62J 1/08 280/287 |
| 2014/0175771 A1 * | 6/2014 | Yu | .......................... | B62K 19/36 280/284 |

(Continued)

*Primary Examiner* — Joseph M Rocca
*Assistant Examiner* — Gabriela C Craciun
(74) *Attorney, Agent, or Firm* — Trop Pruner & Hu, P.C.

(57) ABSTRACT

A bicycle frame includes a frame body including a top tube, a seat tube, a seat stay, and a mounting unit that is disposed at a junction among the top tube, the seat tube and the seat stay, and that has a base portion, and a position-limiting portion extending from the base portion, a seat post unit including a seat post that extends through the base portion, and a post clamp that is fixedly sleeved onto the seat post, and that is retained in the frame body by the position-limiting portion, a cushion sleeved onto the seat post, and having a tube body that is fittingly disposed between the seat post and the base portion, and a sleeve portion that extends from the tube body, and that is disposed between the post clamp and the base portion.

10 Claims, 18 Drawing Sheets

(56) References Cited

U.S. PATENT DOCUMENTS

| | | | | |
|---|---|---|---|---|
| 2015/0034779 A1* | 2/2015 | McAndrews | ............ | B62J 1/08 |
| | | | | 248/125.8 |
| 2015/0321719 A1* | 11/2015 | Schmidt | ................. | B62K 3/02 |
| | | | | 280/261 |
| 2017/0355416 A1* | 12/2017 | Gauthier | ............... | B62K 19/08 |
| 2018/0134337 A1* | 5/2018 | Holtzman | ............. | B62K 19/36 |
| 2018/0273123 A1* | 9/2018 | Eberlberger | .......... | B62K 19/36 |
| 2018/0274562 A1* | 9/2018 | Chambers | ............... | F15B 7/08 |
| 2018/0334210 A1* | 11/2018 | Choltco-Devlin | ......... | B62J 1/08 |
| 2018/0334212 A1* | 11/2018 | Bowers | .................... | B62J 1/04 |

\* cited by examiner

BICYCLE FRAME

CROSS-REFERENCE TO RELATED APPLICATION

This application claims priority of Taiwanese Patent Application No. 105130724, filed on Sep. 23, 2016.

FIELD

The disclosure relates to a frame, and more particularly to a bicycle frame.

BACKGROUND

When riding a conventional bicycle, a rider may feel uncomfortable since the vibration may be transmitted from a rear wheel to a saddle through a frame of the conventional bicycle. Therefore, how to improve shock absorption effectiveness and how to increase the riding comfort become main issues.

SUMMARY

Therefore, the object of the disclosure is to provide a bicycle frame that can improve shock absorption effectiveness, and that can increase the riding comfort.

According to the disclosure, the bicycle frame includes a frame body, a seat post unit and a cushion. The frame body includes a top tube, a seat tube, a seat stay, and a mounting unit disposed at a junction among the top tube, the seat tube and the seat stay, and having a base portion that is connected to the top tube, the seat tube and the seat stay, and a position-limiting portion that extends from the base portion. The seat post unit includes a seat post extending through the base portion of the frame body, and a post clamp fixedly sleeved onto the seat post, and retained in the frame body by the position-limiting portion. The cushion is sleeved onto the seat post, and has a tube body fittingly disposed between the seat post of the seat post unit and the base portion of the frame body, and a sleeve portion extending from the tube body, and disposed between the post clamp of the seat post unit and the base portion of the frame body.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
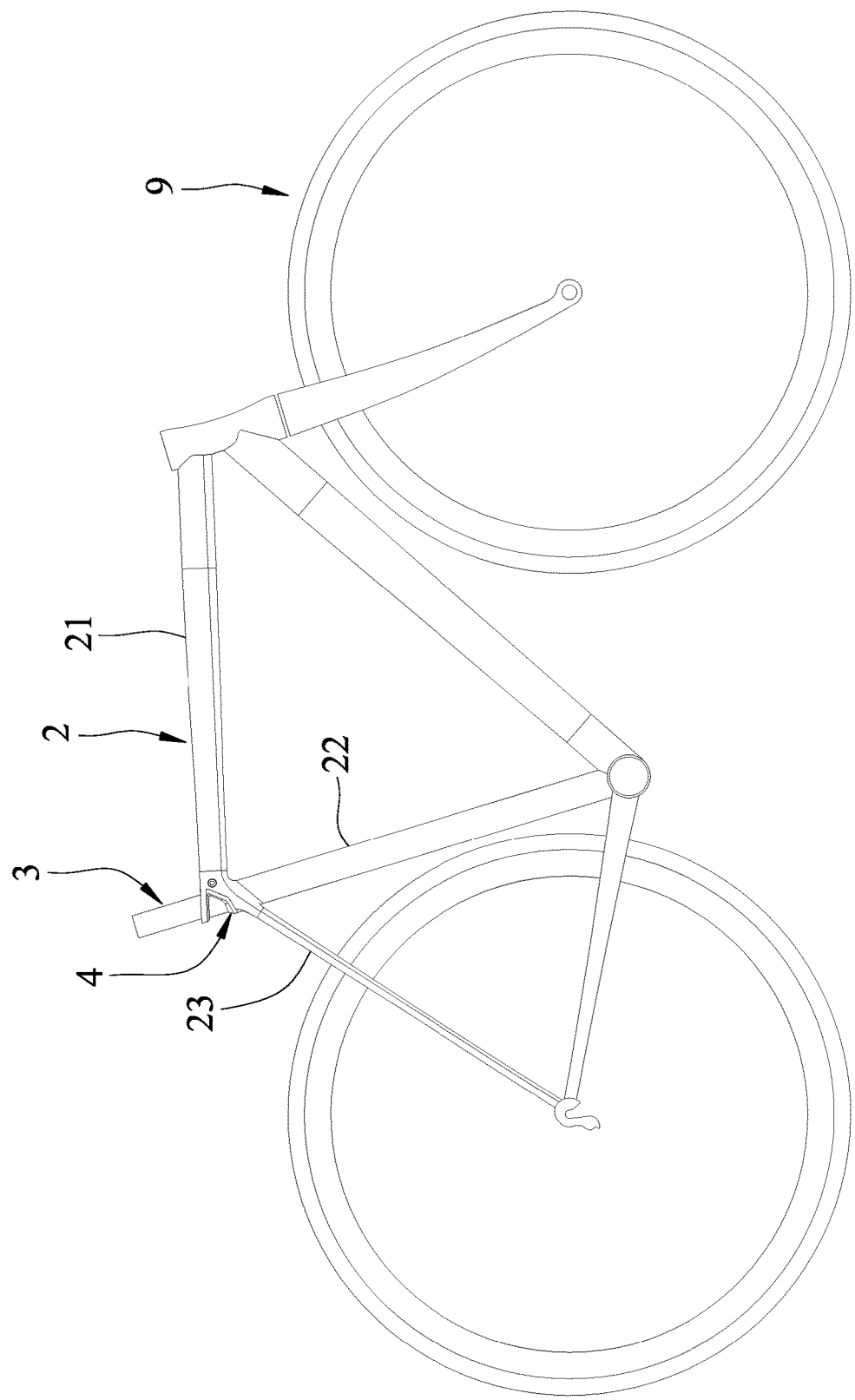
FIG. 1 is a schematic side view of a first embodiment of a bicycle frame according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
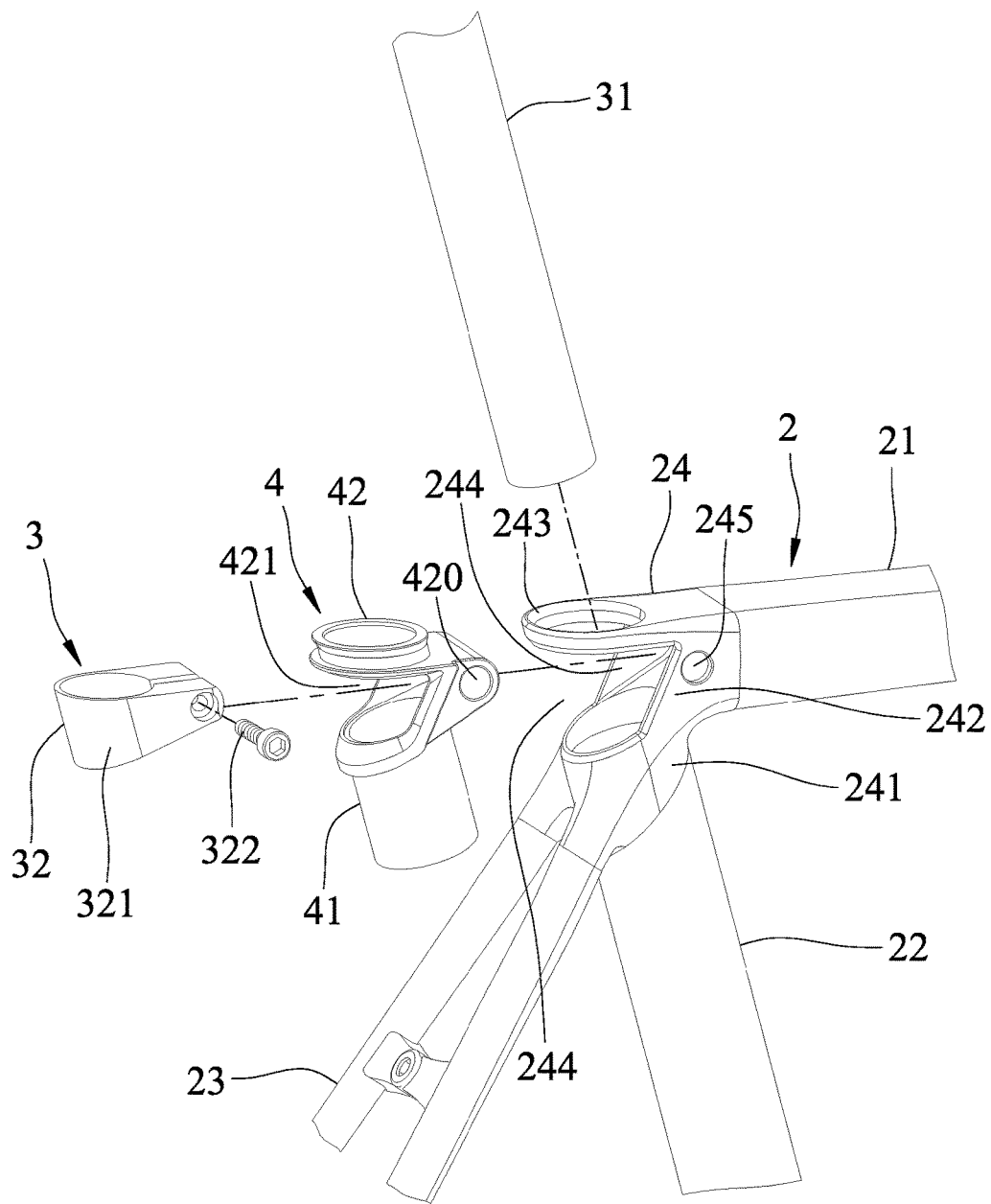
FIG. 2 is a fragmentary exploded perspective view of the first embodiment.

As shown in FIG. 1 and FIG. 2, the first embodiment of a bicycle frame according to the disclosure is a part of a bicycle 9, and includes a frame body 2, a seat post unit 3 and a cushion 4.

Figure 3:
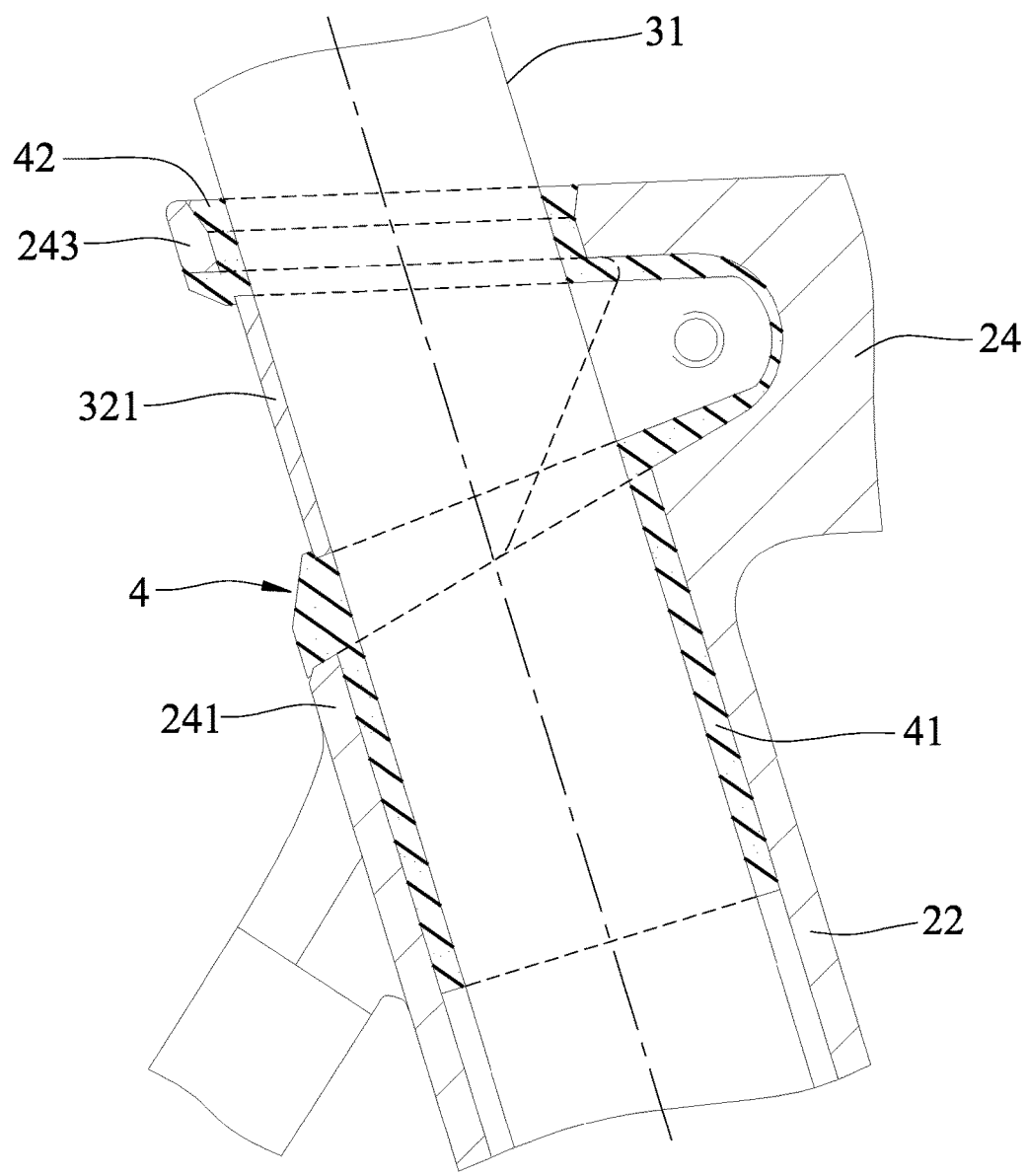
FIG. 3 is a fragmentary sectional view of the first embodiment.
Figure 4:
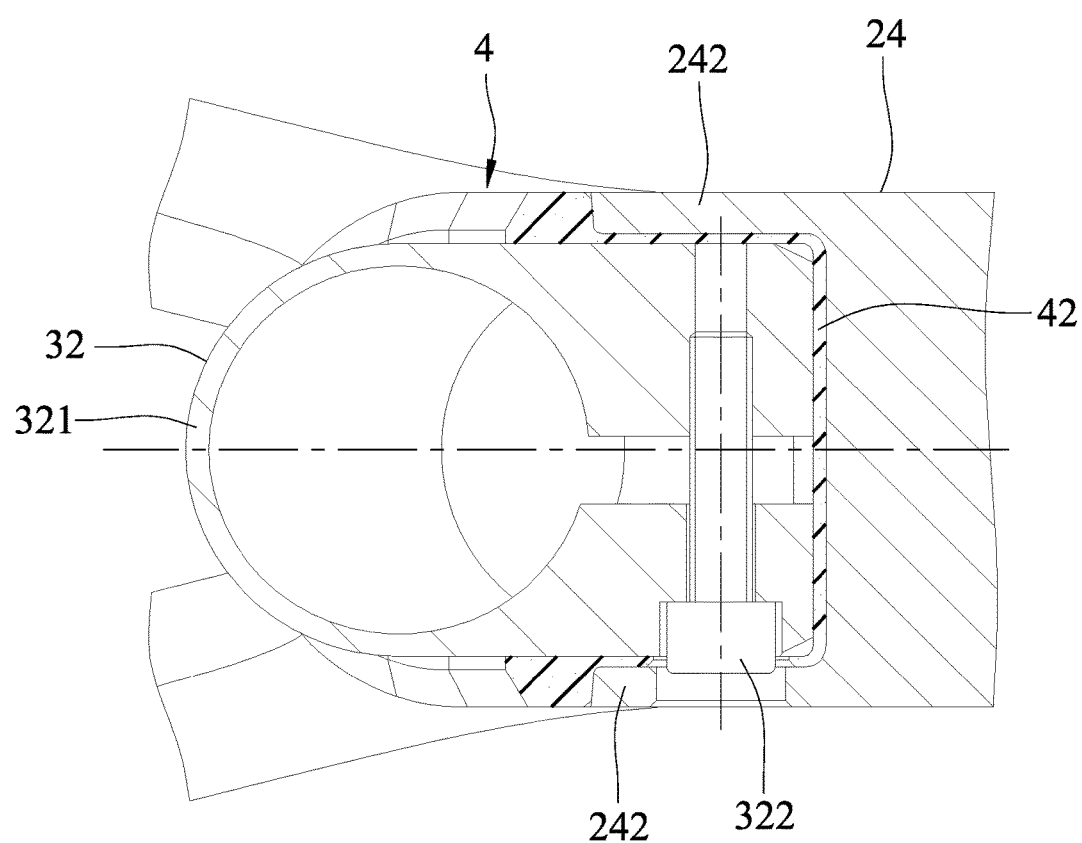
FIG. 4 is a fragmentary sectional view of the first embodiment.

Referring to FIGS. 2 to 4, the frame body 2 includes a top tube 21, a seat tube 22, a seat stay 23, and a mounting unit 24 disposed at a junction among the top tube 21, the seat tube 22 and the seat stay 23. The mounting unit 24 has a base portion 241 connected to the top tube 21, the seat tube 22 and the seat stay 23, two side portions 242, and a position-limiting portion 243 extending from the base portion 241. The position-limiting portion 243 cooperates with the base portion 241 to define a receiving space 244.

The side portions 242 respectively extend from two opposite sides of the base portion 241, and respectively abut against two opposite sides of the cushion 4. Each of the side portions 242 is formed with a through hole 245 (only one is visible in FIG. 2).

It should be noted that, in this embodiment, the position-limiting portion 243 extends from the base portion 241, and is configured as a female snap button for retaining the cushion 4. The configuration of the position-limiting portion 243 may be varied in other embodiments.

The seat post unit 3 includes a seat post 31 extending through the base portion 241 and the position-limiting portion 243 of the frame body 2, and a post clamp 32 fixedly sleeved onto the seat post 31, and retained in the frame body 2 by the position-limiting portion 243.

The post clamp 32 has a C-shaped clamp portion 321 sleeved onto the seat post 31, and includes a screw 322 extending through two ends of the clamp portion 321 for clamping the seat post 31 within the post clamp 32.

The cushion 4 is sleeved onto the seat post 31, and has a tube body 41 and a sleeve portion 42. It should be noted that, the cushion 4 is made of non-metal material such as plastic and rubber for different types of the bicycle 9 and different riding requirements.

The tube body 41 is fittingly disposed between the seat post 31 of the seat post unit 3 and the base portion 241 of the frame body 2, and extends through the base portion 241 of the frame body 2. The sleeve portion 42 extends from the tube body 41, is disposed between the post clamp 32 of the seat post unit 3 and the base portion 241 of the frame body 2, and is formed with a mounting groove 421 disposed for receiving the post clamp 32 of the seat post unit 3, and a mounting hole 420 aligned with the through holes 245 of the side portions 242. In this embodiment, the sleeve portion 42 is configured as a male snap button, and the position-limiting portion 243 is snap fitted to a top part of the sleeve portion 42, and such configuration may be varied in other embodiments. The sleeve portion 42 is received in the receiving space 244 of the frame body 2, and is retained between the side portions 242 of the frame body 2. The outer shape of the sleeve portion 42 corresponds to the inner shape of the mounting unit 24, and the inner shape of the sleeve portion 42 corresponds to the outer shape of the post clamp 32.

It should be noted that, since the base portion 241 cooperates with the side portions 242 and the position-limiting portion 243 to define the receiving space 244 in the mounting unit 24 for fittingly receiving the sleeve portion 42 of the cushion 4, and since the post clamp 32 is received fittingly within the mounting groove 421 of the cushion 4, the cushion 4 can be prevented from being squeezed into the frame body 2 when assembling the seat post 31, and can be prevented from falling off from the bicycle frame.

It also should be noted that, since one part of the sleeve portion 42 that is located above the mounting groove 421 is not required to support the weight of a rider, and the remaining part of the sleeve portion 42 is required to support the weight of the rider, the seat post 31 and the post clamp 32, the thickness of the one part of the sleeve portion 42 that is located above the mounting groove 421 is smaller than the thickness of the remaining part of the sleeve portion 42.

Figure 5:
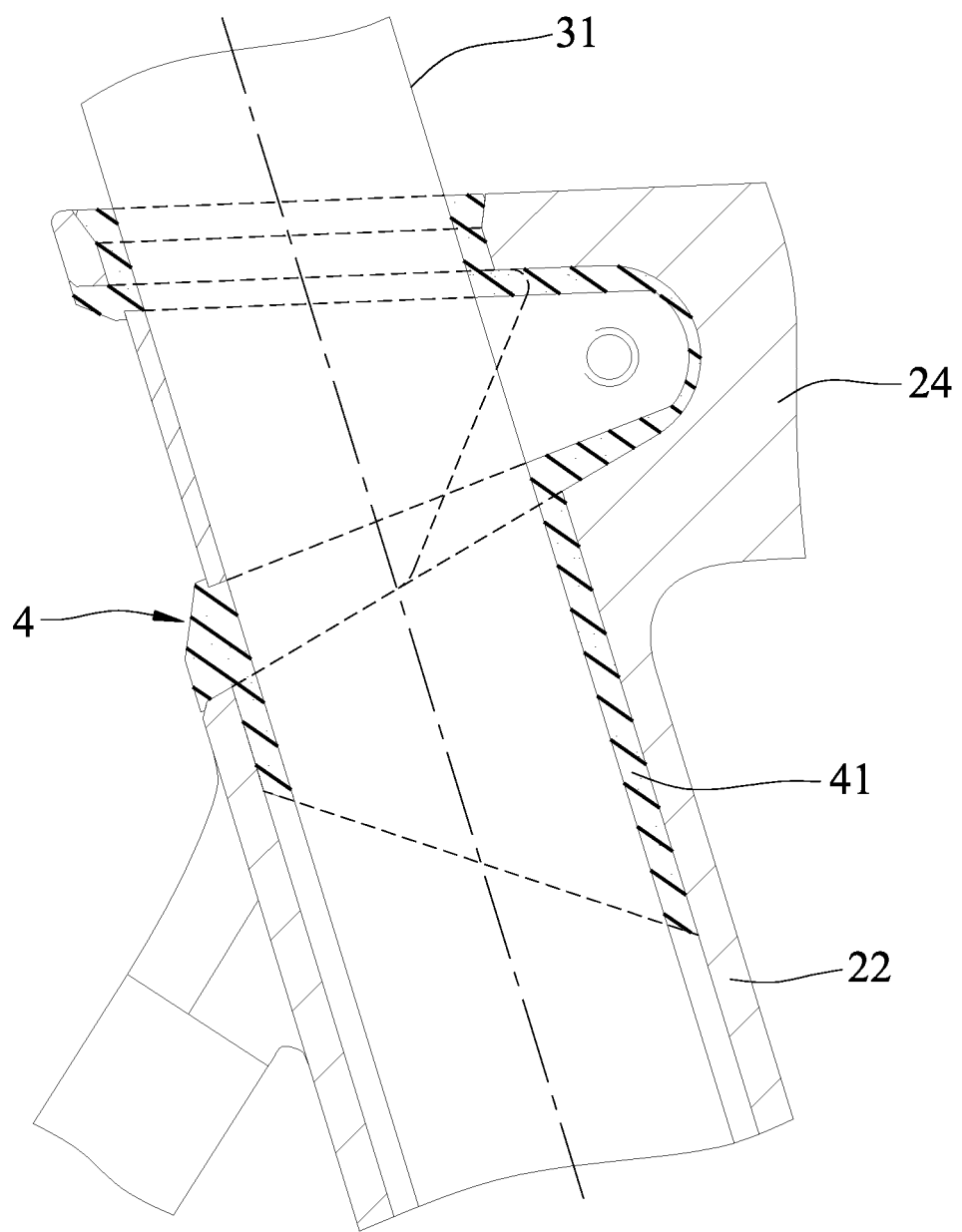
FIG. 5 is a fragmentary sectional view of a first variation of the first embodiment.
Figure 6:
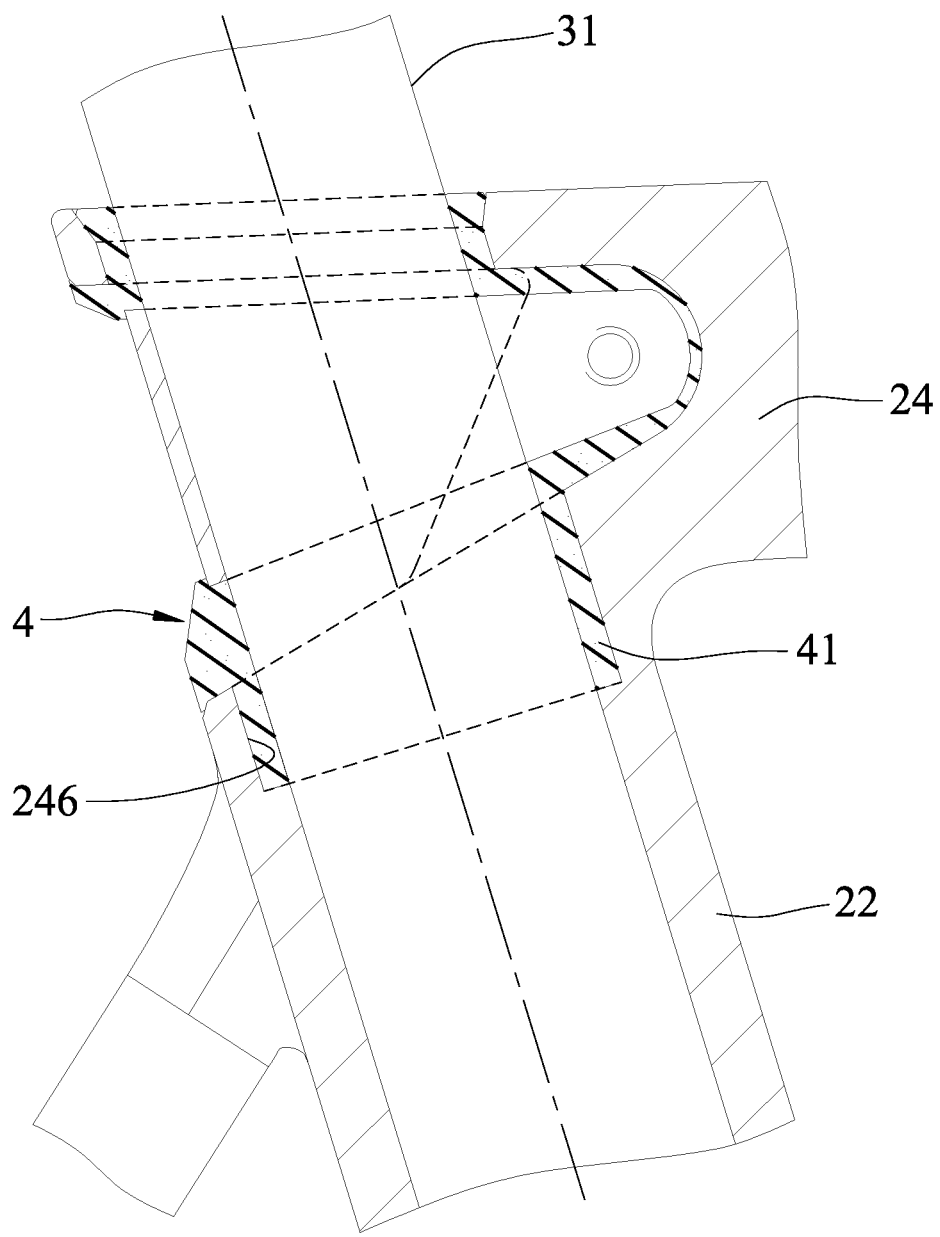
FIG. 6 is a fragmentary sectional view of a second variation of the first embodiment.

As shown in FIG. 3, in the first embodiment, the tube body 41 extends in the mounting unit 24 and the seat tube 22, and a bottom end surface of the tube body 41 is perpendicular to the extending direction thereof. With such configuration, the tube body 41 can cover a majority part of the outer surface area of a portion of the seat post 31 that is disposed within the mounting unit 24, and a swing space is formed between the seat post 31 and the seat tube 22 for the seat post 31 to swing. Therefore, the seat post 31 can be stably supported, and the bicycle frame has good shock absorption. As shown in FIG. 5, in a first variation of the first embodiment, the bottom end surface of the tube body 41 is inclined relative to the extending direction thereof. With such configuration, the cushion 4 can be easily mounted into the mounting unit 24 when assembling the bicycle frame. Therefore, the bicycle frame is convenient to assemble. As shown in FIG. 6, in a second variation of the first embodiment, an inner wall surface of the frame body 2 is formed with an engaging groove 246 extending from the mounting unit 24 to the seat tube 22, and the tube body 41 of the cushion 4 engages the engaging groove 246 in a fitting manner. With such configuration, there is not any significant space occurring between the seat post 31 and the seat tube 22. Therefore, a firm and stable support is provided to the seat post 31. It should be noted that, the rider can choose different variations of the bicycle frame based on the requirements.

Referring to FIGS. 2 to 4, during assembly, the cushion 4 is first mounted into the receiving space 244 of the frame body 2 from an opening between the base portion 241 and the position-limiting portion 243, such that the tube body 41 of the cushion 4 is inserted into the seat tube 22 through the mounting unit 24, and the sleeve portion 42 is fittingly engaged into the receiving space 244 of the mounting unit 24. The post clamp 32 is then mounted into the sleeve portion 42 of the cushion 4, such that the clamp portion 321 fits with the mounting groove 421 of the sleeve portion 42. Subsequently, the screw 322 is inserted through the through holes 245 and the mounting hole 420. Finally, the seat post 31 is inserted into the seat tube 22 from the position-limiting portion 243 of the mounting unit 24 to a desired position, and the screw 322 is then tightened to fix the position of the seat post 31 relative to the seat tube 22.

Figure 7:
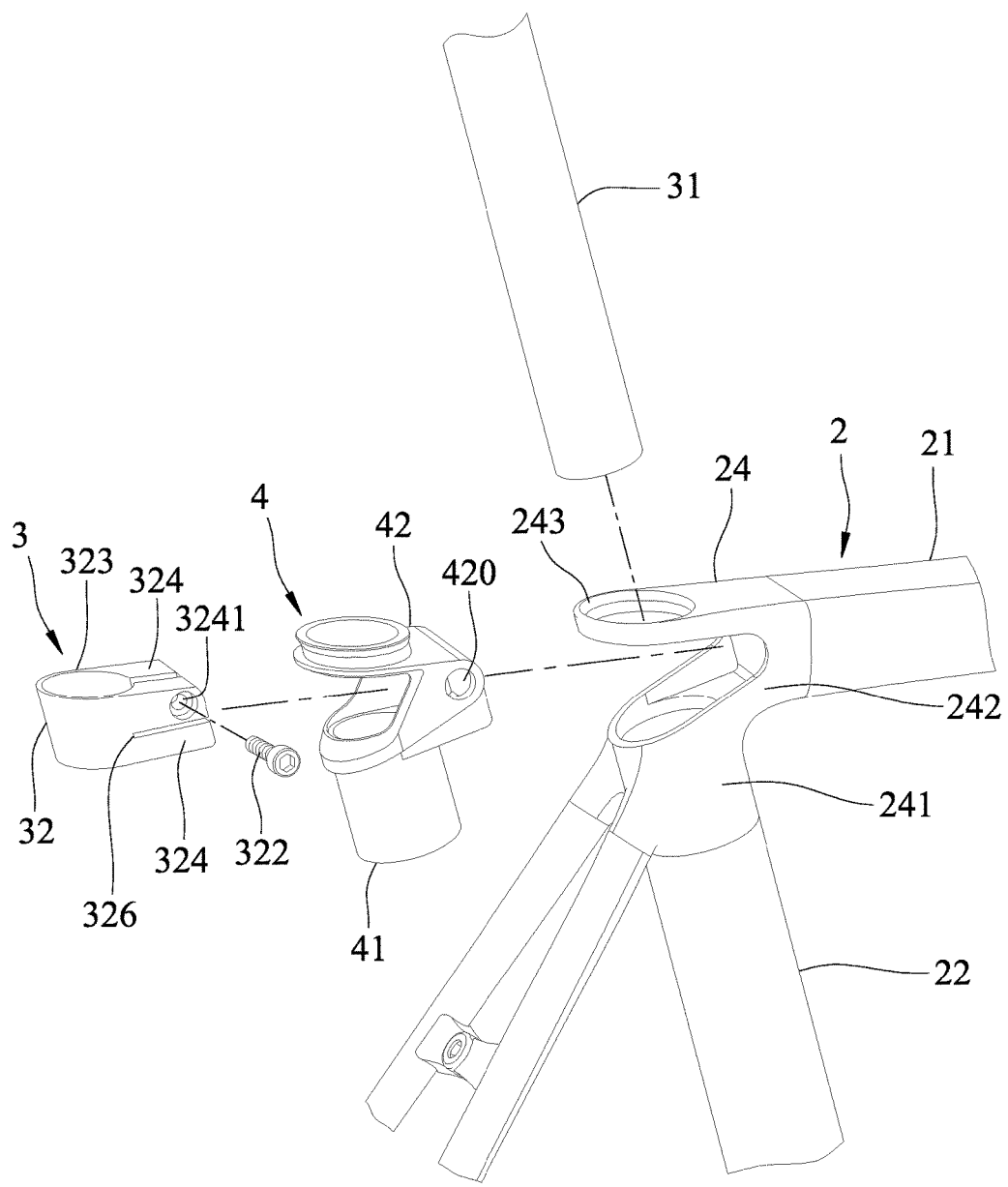
FIG. 7 is a fragmentary exploded perspective view of a third variation of the first embodiment.
Figure 8:
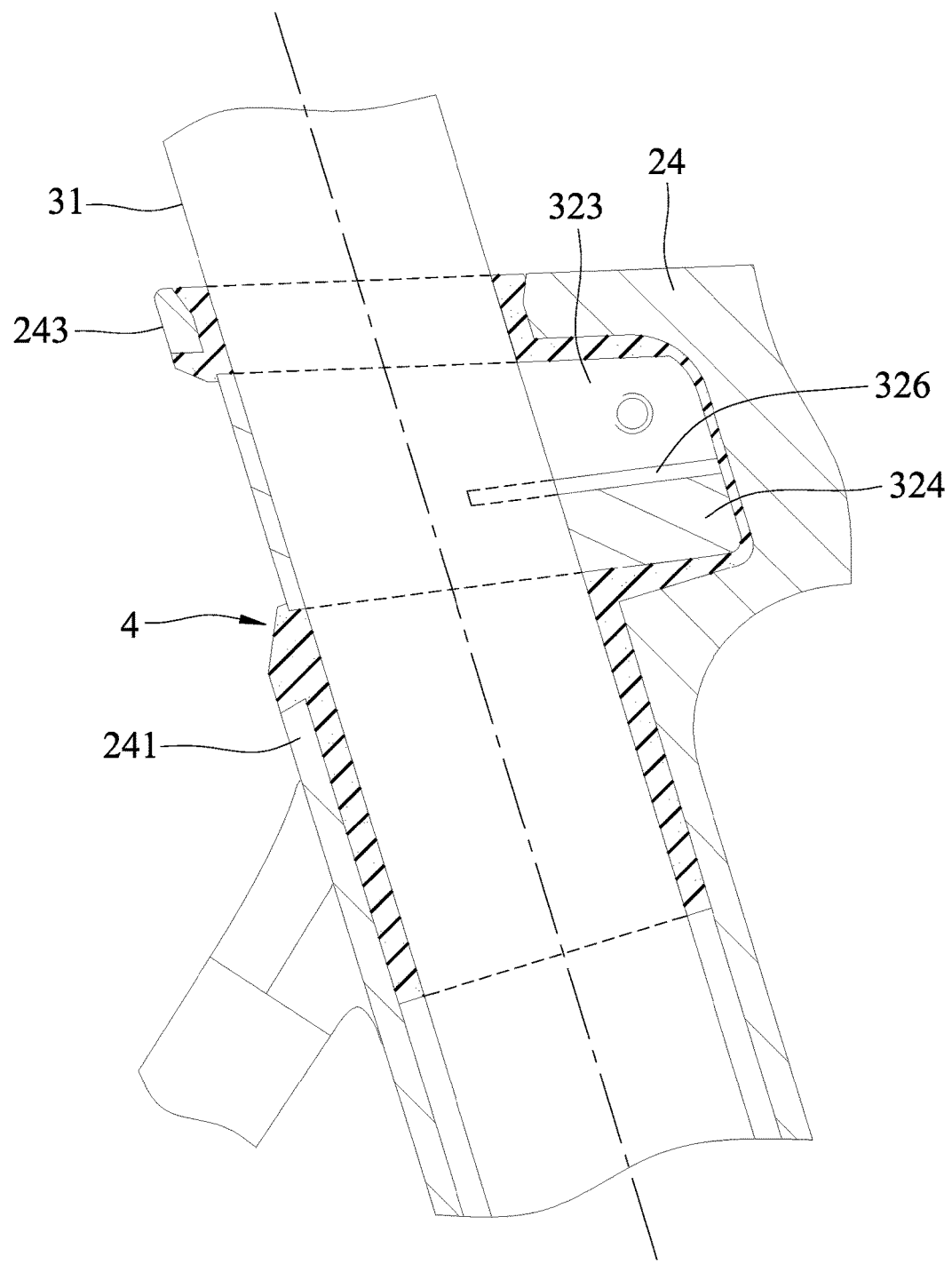
FIG. 8 is a fragmentary sectional view of the third variation of the first embodiment.
Figure 9:
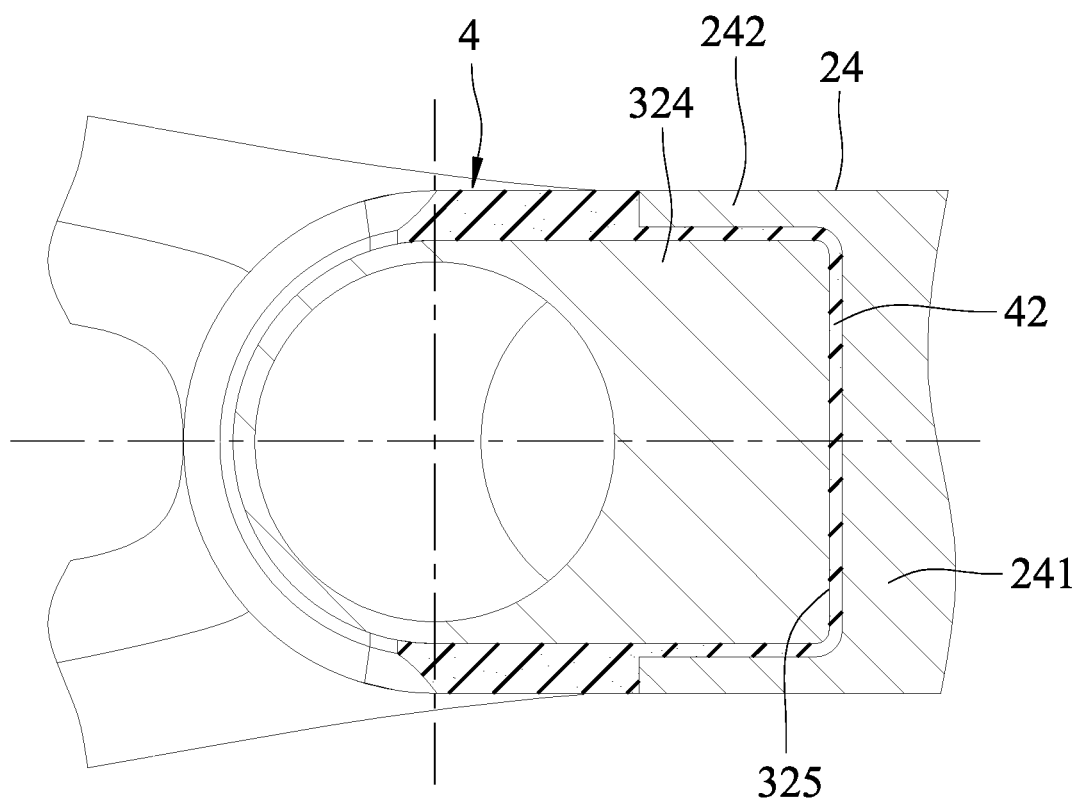
FIG. 9 is another fragmentary sectional view of the third variation of the first embodiment.

Referring to FIGS. 7 to 9, in a third variation of the first embodiment, the post clamp 32 has a C-shaped portion 323 sleeved onto the seat post 31, and two juxtaposed abutment portions 324, which respectively extend from two ends of the C-shaped portion 323 and each of which is formed with a threaded hole 3241 (only one is visible in FIG. 7). The screw 322 engages the threaded holes 3241 of the abutment portions 324 to fasten the abutment portions 324 together so as to clamp the seat post 31 within the post clamp 32. The sleeve portion 42 of the cushion 4 is complementary in shape to the post clamp 32 and the mounting unit 24, so that the post clamp 32 and the cushion 4 and be fittingly mounted within the mounting unit 24 of the frame body 2.

Each of the abutment portions 324 of the post clamp 32 in the third variation of the first embodiment has an open-ended horizontal slot 326 (only one is visible in FIG. 7) formed in a middle portion thereof. With such configuration, when the post clamp 32 is fastened by the screw 322, a bottom part of each of the abutment portions 324 can still fittingly abut against the sleeve portion 42, so that rotation of the post clamp 32 in the mounting unit 24 can be prevented. Therefore, the bicycle frame has a better structural stability.

In conclusion, with the abovementioned configuration, the bicycle frame of the disclosure has the following advantages:

1. With the disposition of the cushion 4 between the seat post 31 and the mounting unit 24, when the rider is riding the bicycle 9, vibration can be absorbed by the cushion 4, and will not be transmitted to the seat post 31 and a saddle (not shown) through the frame body 2. Therefore, the shock absorption can be assured, the structural stability is increased, and the riding comfort for the rider is also increased.

In addition, the post clamp 32 clamps the seat post 31, and is received by the cushion 4, so that the rotational range of the post clamp 32 and the seat post 31 is limited. Therefore, a better structural stability is achieved.

2. With the disposition of the side plate portions 242, the displacement of two lateral sides of the sleeve portion 42 induced by a large swing degree of the seat post 31 and the post clamp 32 can be prevented. Therefore, the better structural stability is also achieved.

3. The sleeve portion 42 is complementary in shape to the post clamp 32 and the mounting unit 24, so that the cushion 4 and the seat post unit 3 can be fittingly mounted to the frame body 2, good position limiting effectiveness is provided, and an appropriate distance between the frame body 2 and the seat post 31 is maintained for increasing the structural stability. Furthermore, the cushion 4 can be prevented from being squeezed into the frame body 2 and being damaged when assembling the seat post 31 to the frame body 2.

Moreover, the sleeve portion 42 and the post clamp 32 are fittingly received in the receiving space 244, so that the appearance of the bicycle frame is more pleasing.

4. The three variations of the first embodiment respectively provide a bicycle frame with good shock absorption, a bicycle frame that can be conveniently assembled, and a bicycle frame with a firm and stable support. The rider can choose different variations of the first embodiment of the bicycle frame based on different requirements.

Figure 10:
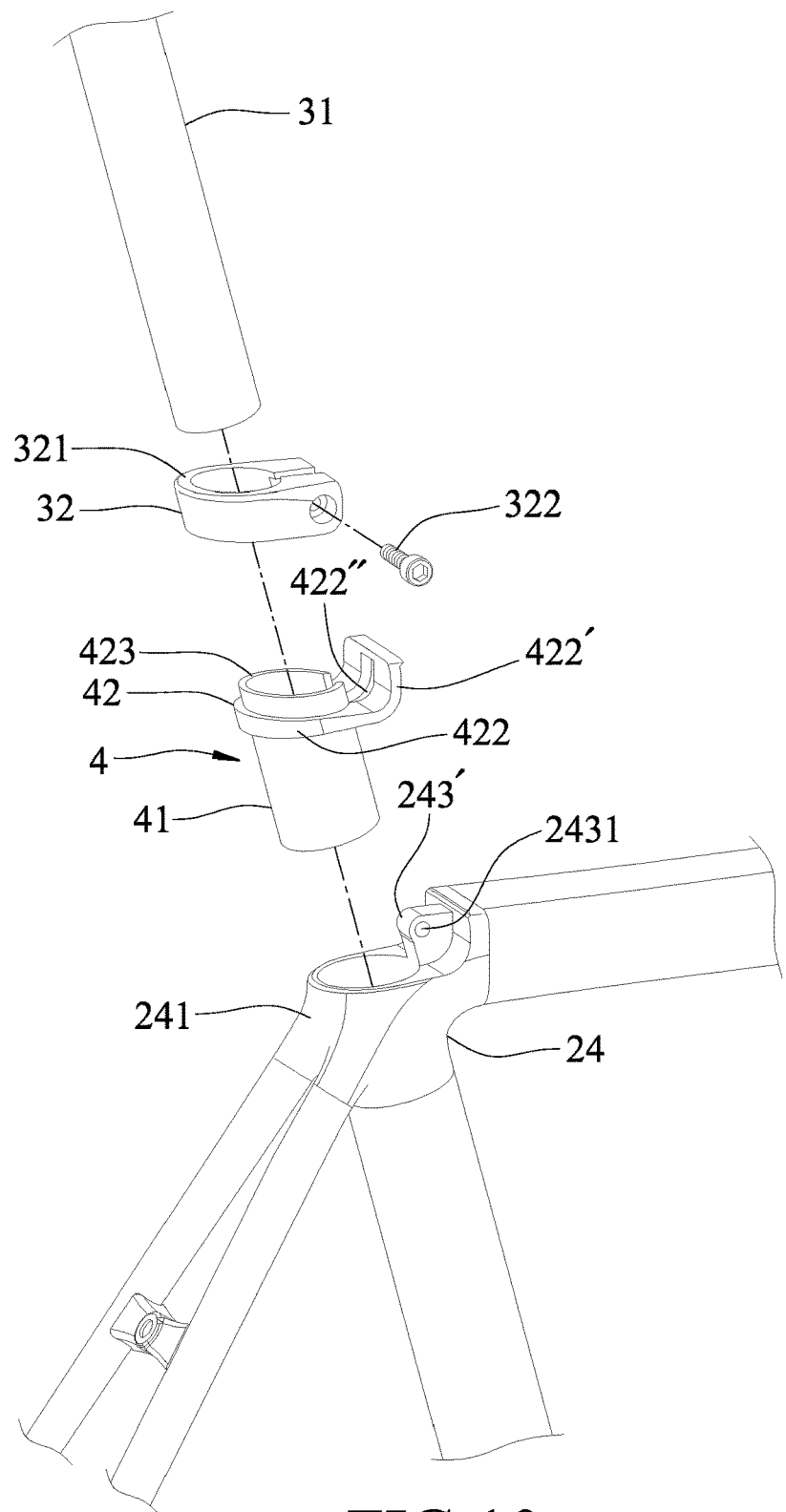
FIG. 10 is a fragmentary exploded perspective view of a second embodiment of the bicycle frame according to the disclosure.
Figure 11:
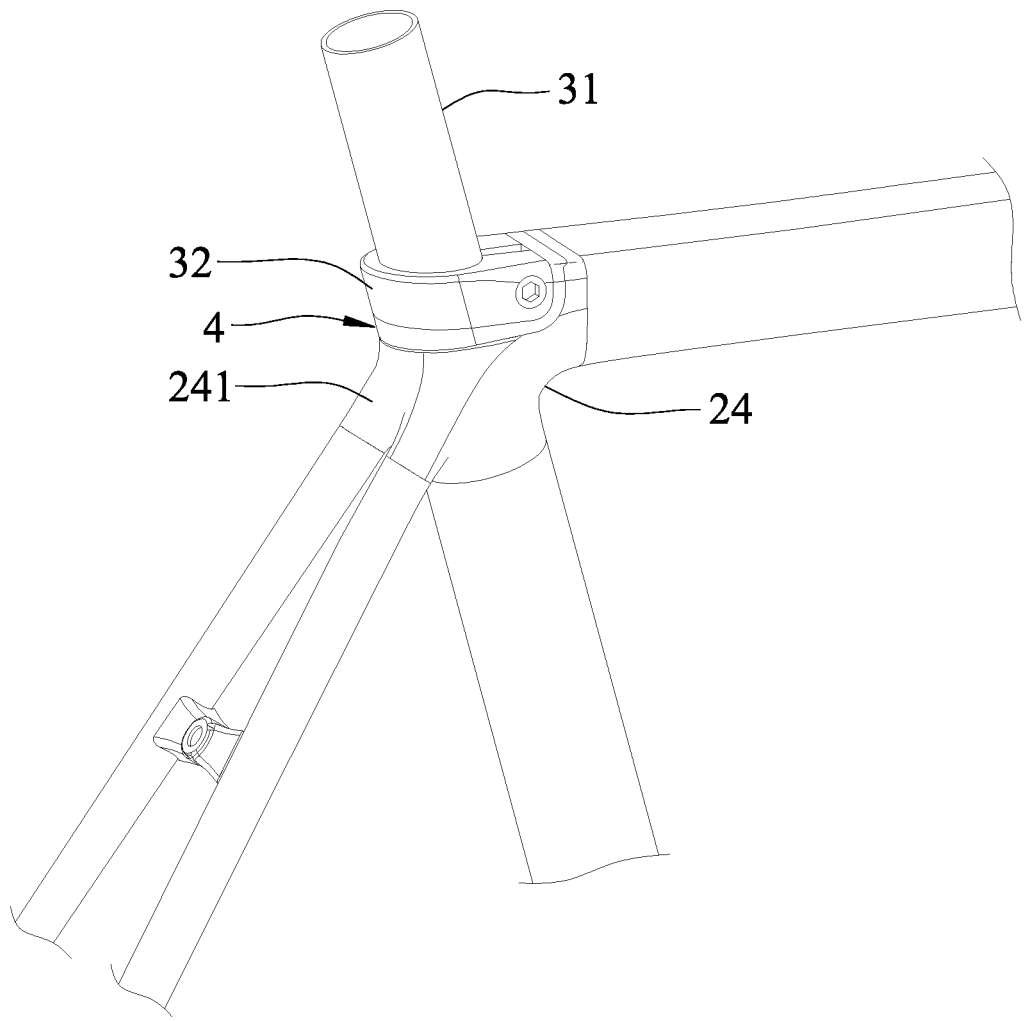
FIG. 11 is a fragmentary perspective view of the second embodiment.
Figure 12:
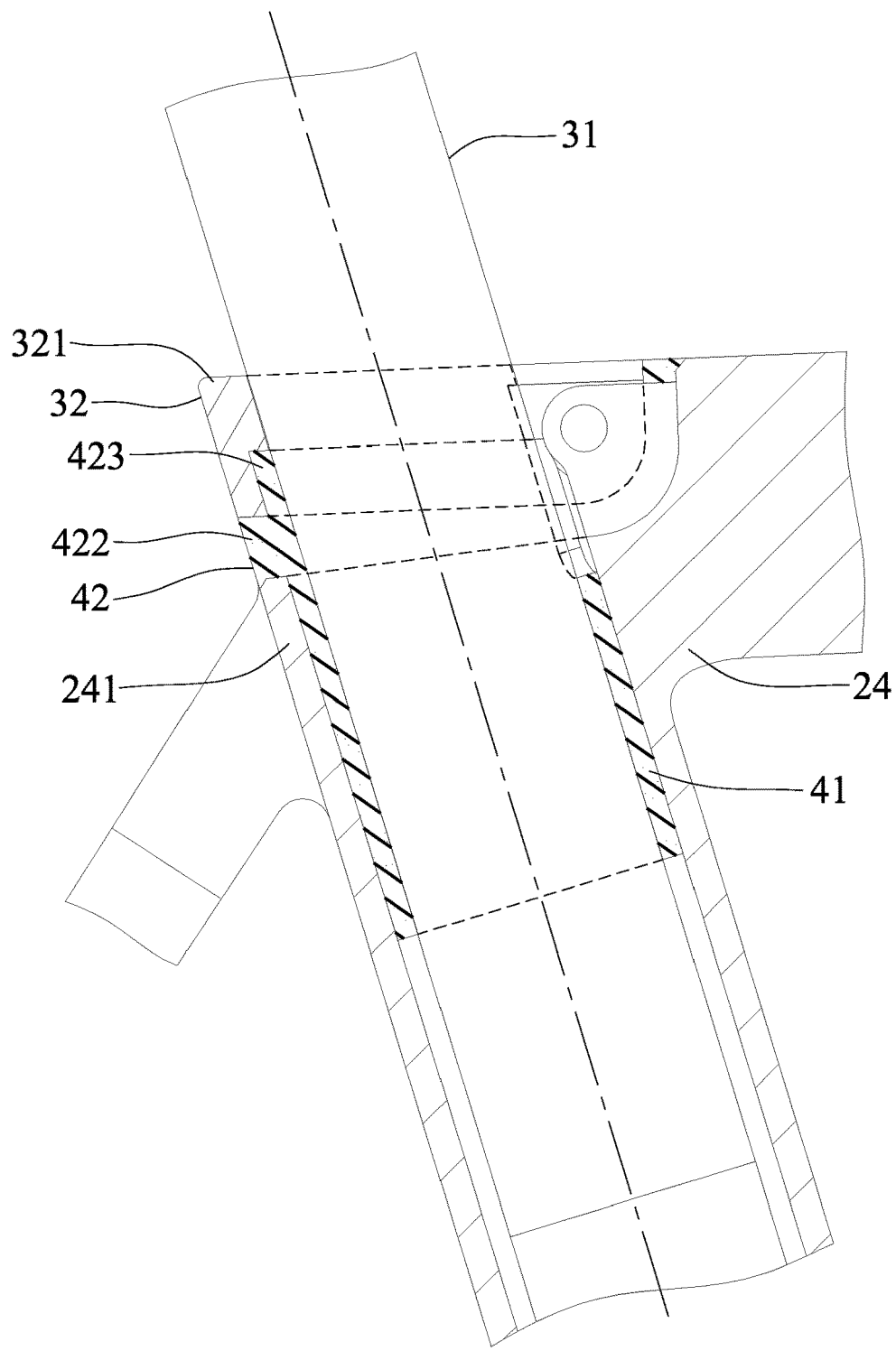
FIG. 12 is a fragmentary sectional view of the second embodiment.

Referring to FIGS. 10 to 12, the second embodiment has a structure similar to that of the first embodiment. The main difference between this embodiment and the previous embodiment resides in that:

the sleeve portion 42 has a bottom buffer plate 422 extending from the tube body 41, and disposed between the post clamp 32 of the seat post unit 3 and the base portion 241 of the frame body 2;

a lower portion of the bottom buffer plate 422 fits with the base portion 241 of the frame body 2 for a good structural stability;

the position-limiting portion 243' of the mounting unit 24 is configured as a vertical plate, extends from the base portion 241 into the post clamp 32 through a through hole 422" of a flip-up plate portion 422' of the bottom buffer plate 422 of the sleeve portion 42, and has a fastener hole 2431 permitting the screw 322 to extend therethrough;

the screw 322 extends through two ends of the clamp portion 321 and the fastener hole 2431 of the position-limiting portion 243' for clamping the seat post 31 within the post clamp 32, such that the two ends of the clamp portion 321 clamp the position-limiting portion 243' of the mounting unit 24 therebetween;

the sleeve portion 42 further has a positioning tube portion 423 extending from the bottom buffer plate 422 toward the post clamp 32, and disposed between the post clamp 32 and the seat post 31; and a bottom part of the sleeve portion 42 extends rearwardly and downwardly to fit with the base portion 241.

It should be noted that, since one part of the sleeve portion 42 that is located beside the post clamp 32 is not required to support the weight of the rider, and the remaining part of the sleeve portion 42 is required to support the weight of the rider, the seat post 31 and the post clamp 32, the thickness of the one part of the sleeve portion 42 that is located beside the post clamp 32 is smaller than the thickness of the remaining part of the sleeve portion 42.

During assembly, the tube body 41 of the cushion 4 is first inserted into the seat tube 22 through the mounting unit 24. The post clamp 32 is then mounted onto the sleeve portion 42 of the cushion 4. Subsequently, the seat post 31 is inserted into the seat tube 22, and the screw 322 is inserted through the two ends of the clamp portion 321 and the position-limiting portion 243' of the mounting unit 24. Finally, the seat post 31 is moved and adjusted to a desired position, and the screw 322 is then tightened to fix the position of the seat post 31 relative to the seat tube 22.

Figure 13:
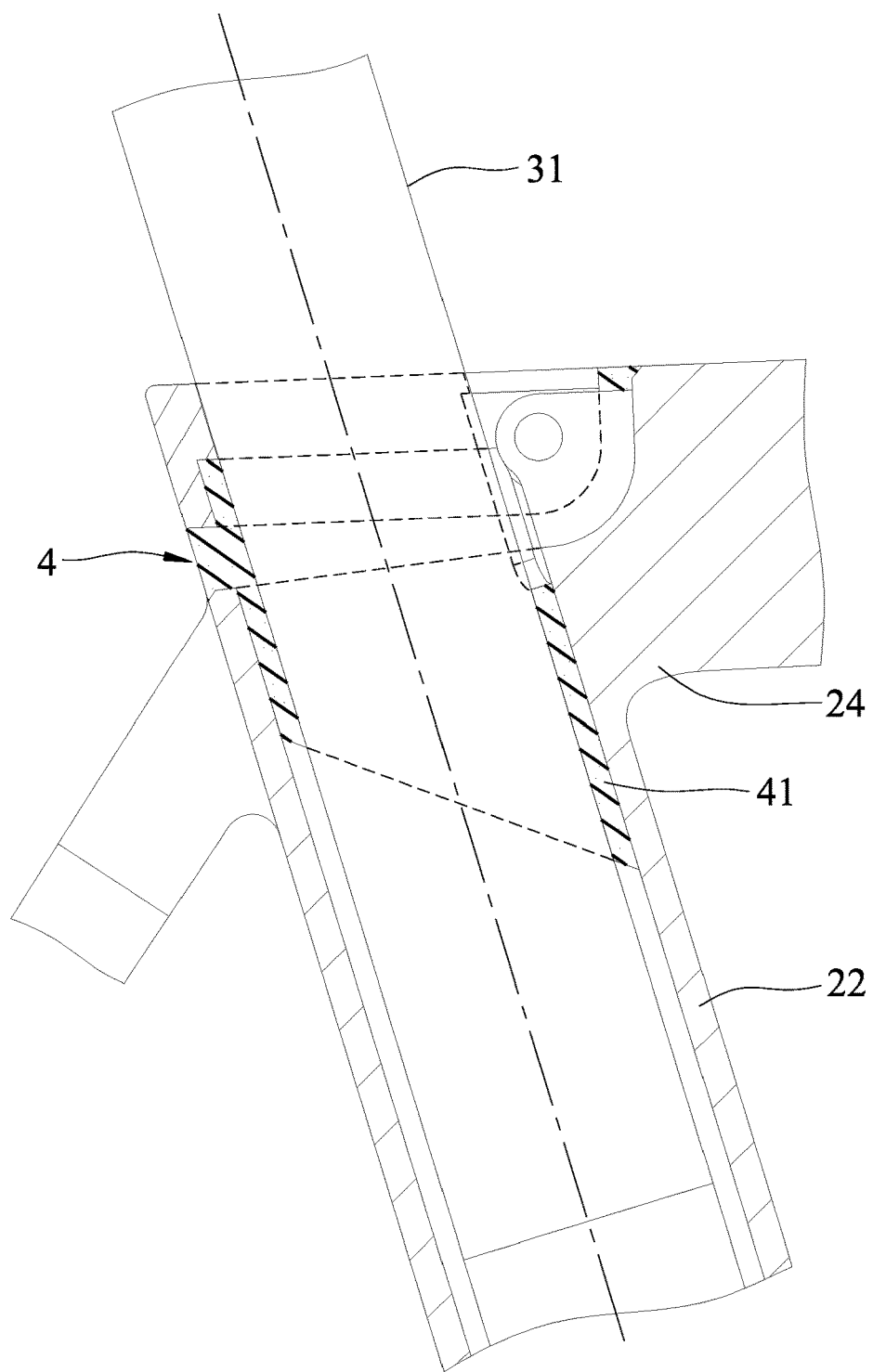
FIG. 13 is a fragmentary sectional view of a first variation of the second embodiment.
Figure 14:
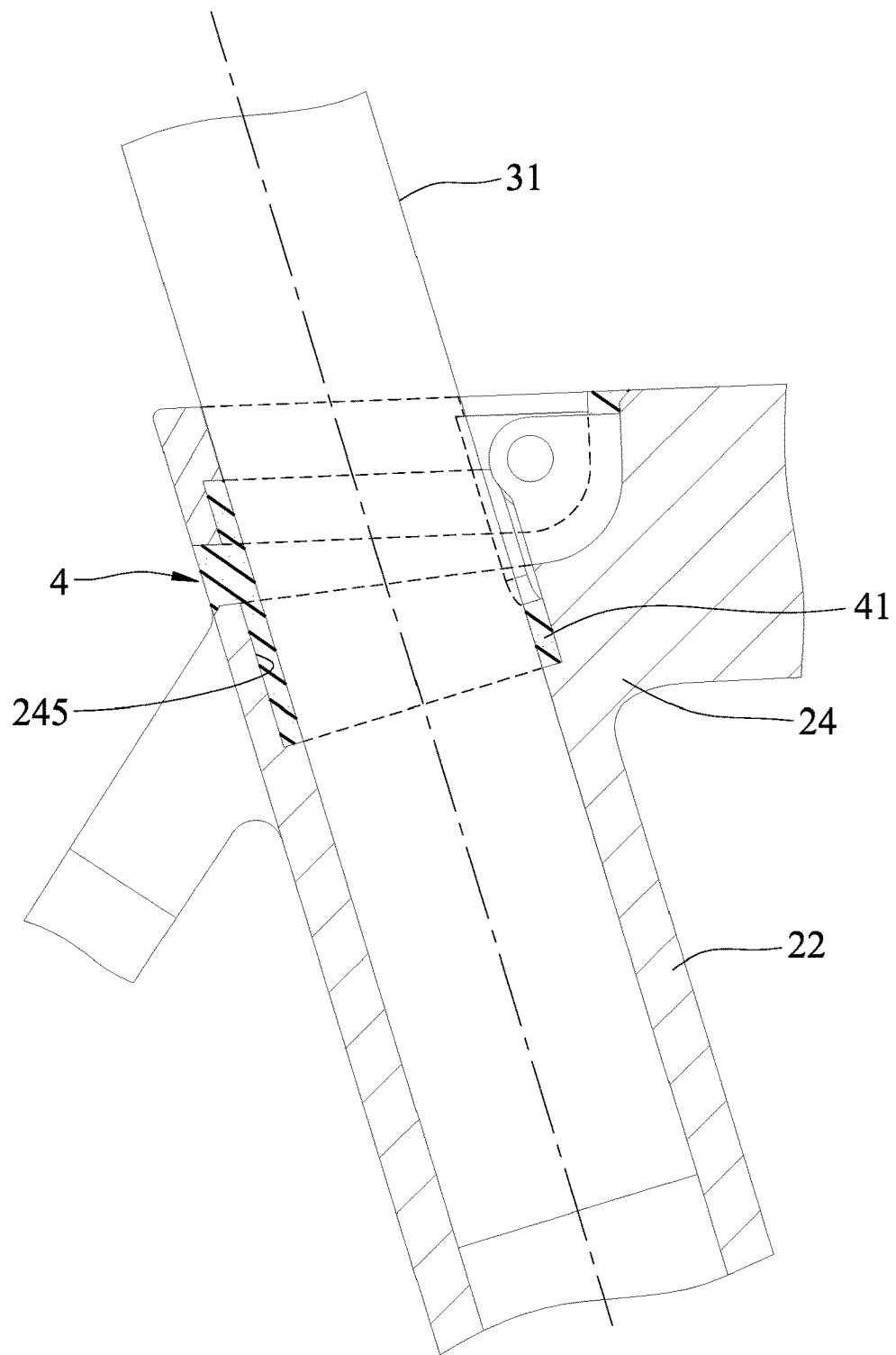
FIG. 14 is a fragmentary sectional view of a second variation of the second embodiment.

Referring to FIGS. 12 to 14, the second embodiment also has first and second variations, which have structural differences that are the same as the first and second variations of the first embodiment, respectively, and the details are thereby omitted herein for the sake of brevity.

Figure 15:
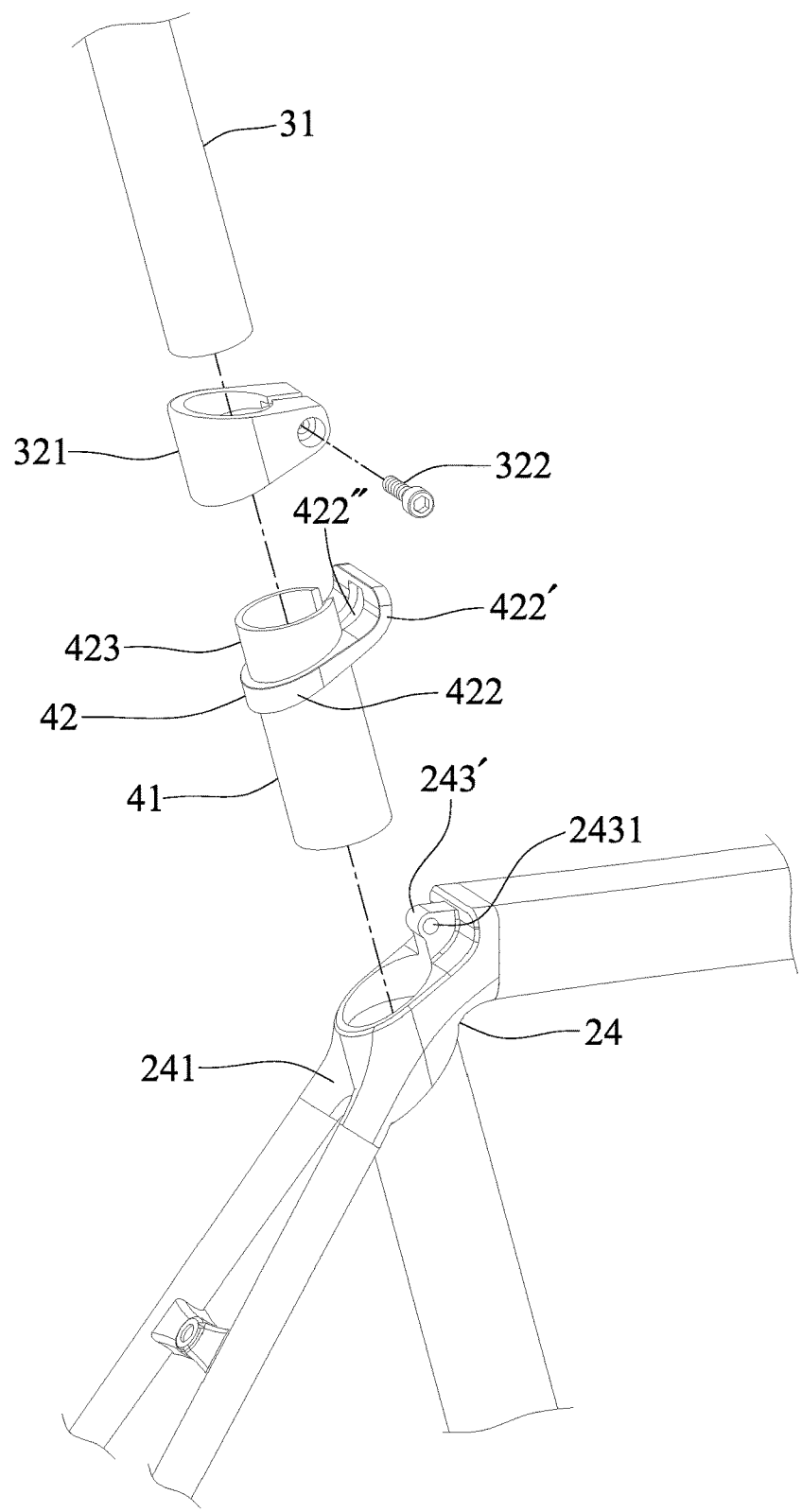
FIG. 15 is a fragmentary exploded perspective view of a third variation of the second embodiment.
Figure 16:
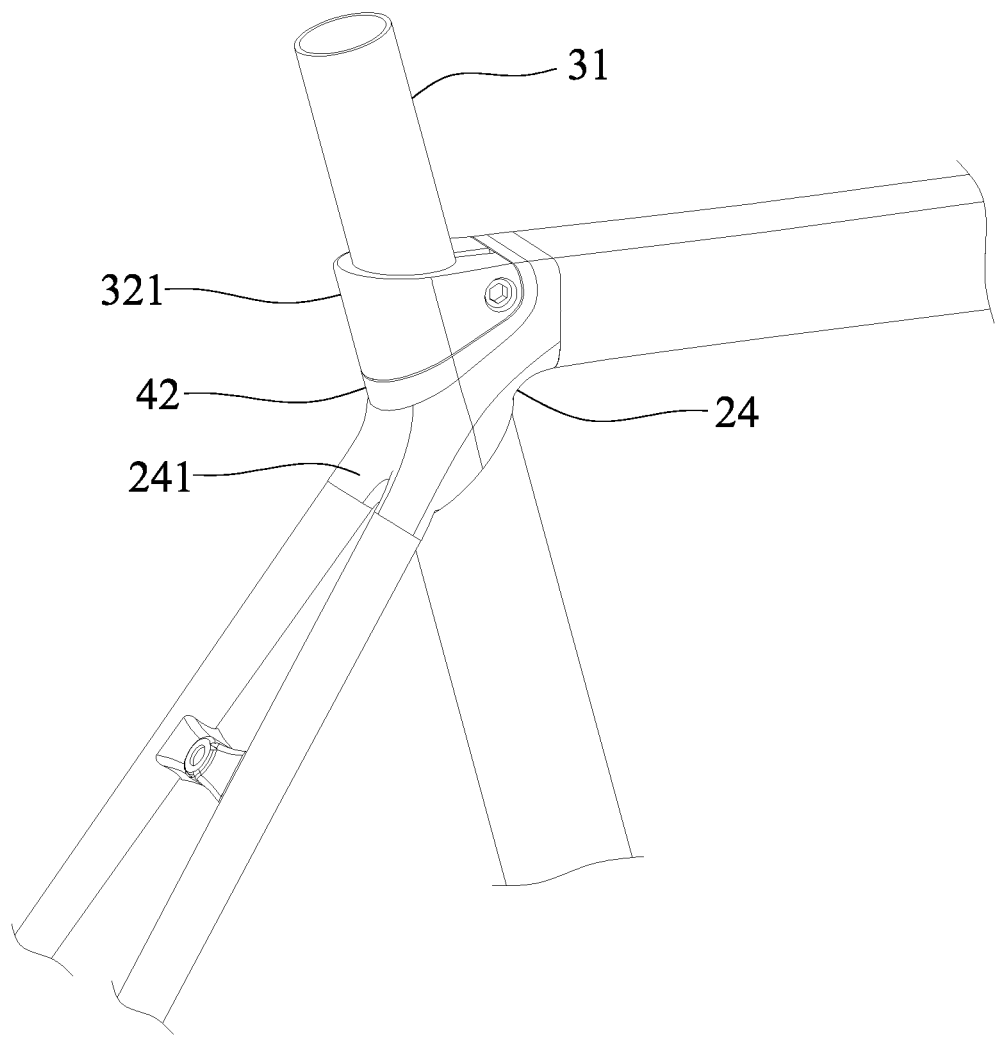
FIG. 16 is a fragmentary perspective view of the third variation of the second embodiment.

Referring to FIGS. 15 and 16, in a third variation of the second embodiment, the thickness of the clamp portion 321 of the post clamp 32 is gradually increased from a front end to a rear end, so that a clamping force of the post clamp 32 is increased, and a clamping stability is also increased. In addition, the mounting unit 24 is configured to have an oblique surface extending rearwardly and downwardly to correspond with the shape of the post clamp 32.

Figure 17:
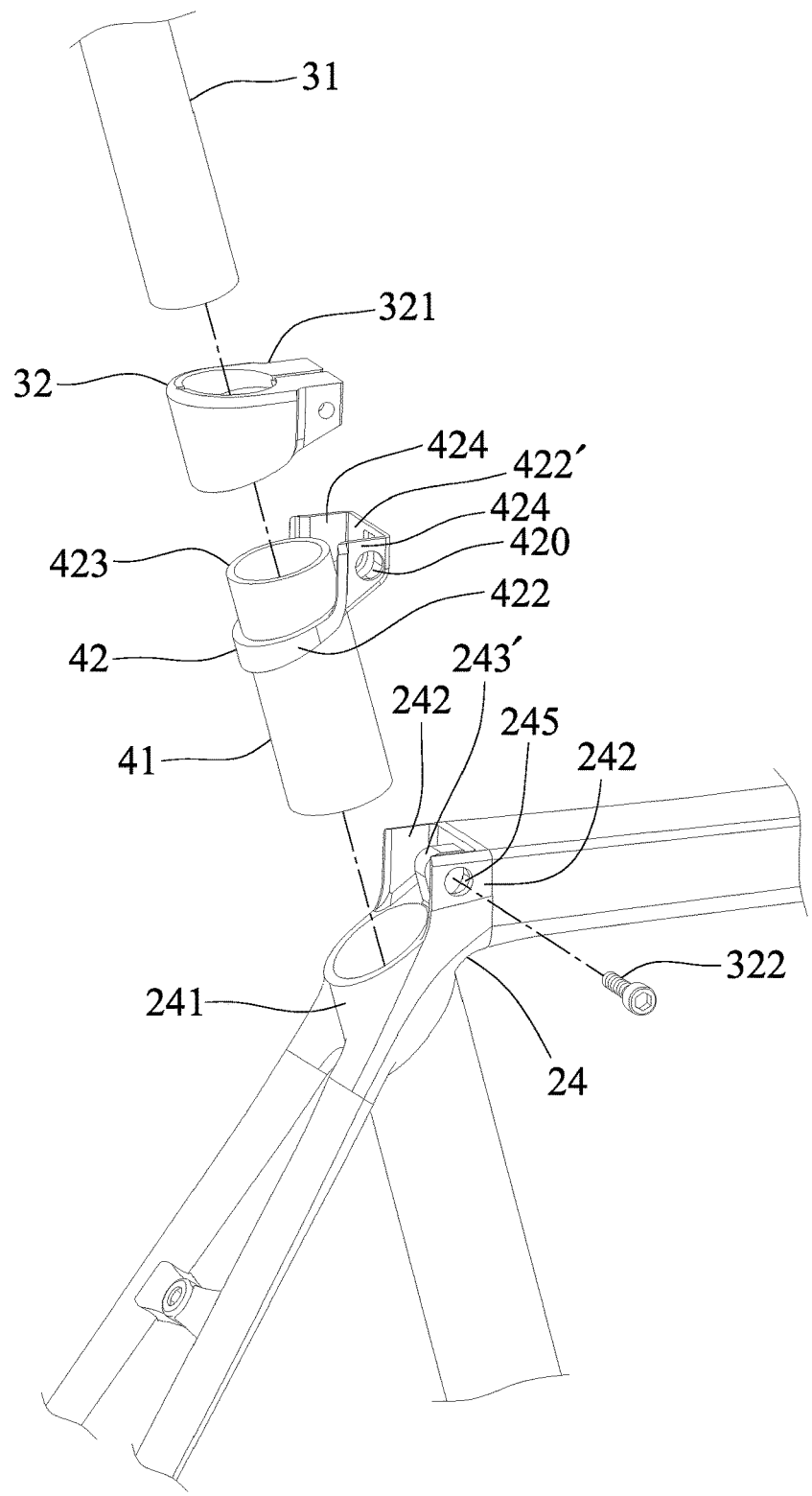
FIG. 17 is a fragmentary exploded perspective view of a fourth variation of the second embodiment.
Figure 18:
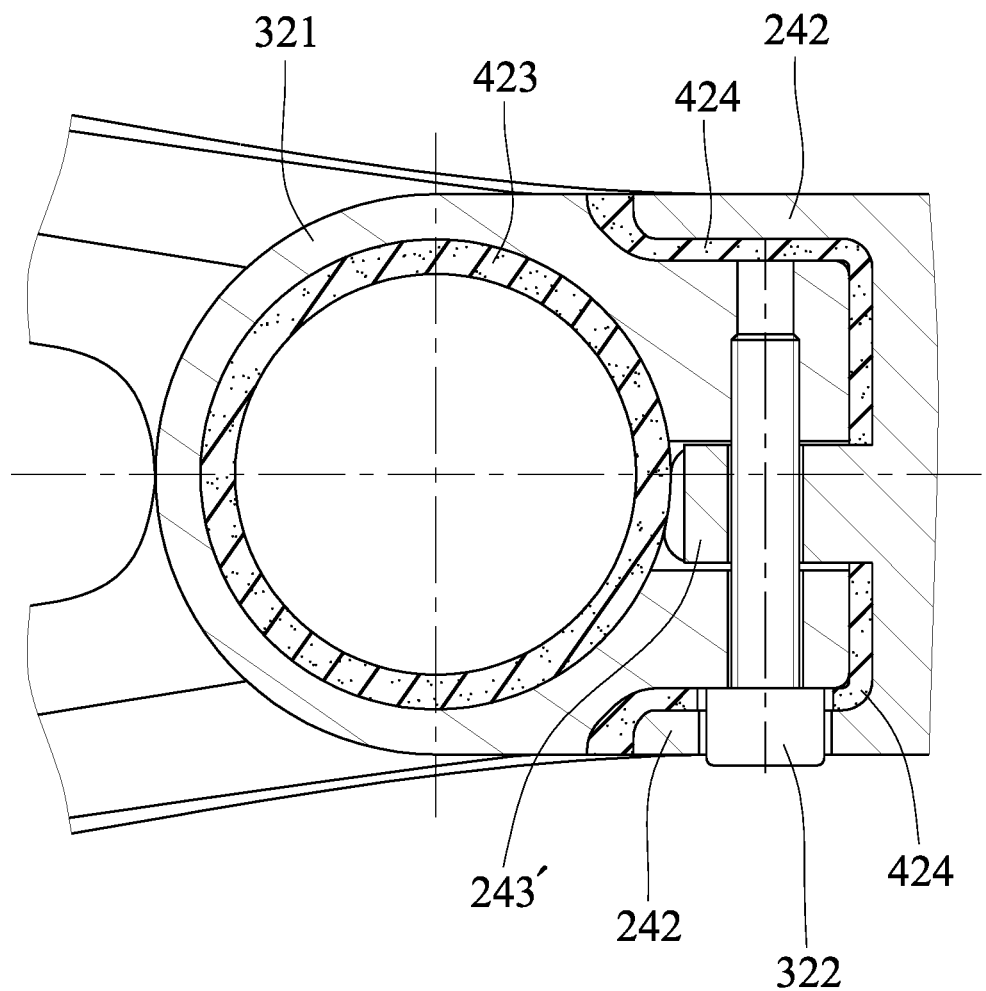
FIG. 18 is a fragmentary sectional view of the fourth variation of the second embodiment.

Referring to FIGS. 17 and 18, in a fourth variation of the second embodiment, the mounting unit 24 further has two opposite upright side plate portions 242 respectively extending from two opposite sides of the base portion 241, and respectively abutting against two opposite sides of the sleeve portion 42 for retaining the sleeve portion 42 between the side plate portions 242.

The sleeve portion 42 further has two side buffer plates 424 respectively extending from two opposite sides of the bottom buffer plate 422, and each being disposed between a respective one of the side plate portions 242 of the frame body 2 and the post clamp 32.

The second embodiment has the same advantages as those of the first embodiment, and further has the following advantages:

1. The second embodiment is easier and more convenient to assemble than the first embodiment. In addition, the outer contour of a bottom end of the post clamp 32 corresponds with that of a portion of the sleeve portion 42 in contact with the post clamp 32, so that the appearance of the bicycle frame is also pleasing.

2. With the disposition of the side buffer plates 424, better shock absorption effectiveness for the post clamp 32 and the mounting unit 24 is provided.

3. With the disposition of the positioning tube portion 423, the structural stability of the bicycle frame is improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A bicycle frame comprising:
    a frame body including a top tube, a seat tube, a seat stay, and a mounting unit that is disposed at a junction among said top tube, said seat tube and said seat stay, and that has a base portion connected to said top tube, said seat tube and said seat stay, and a position-limiting portion extending from said base portion;
    a seat post unit including a seat post that extends through said base portion of said frame body, and a post clamp that is fixedly sleeved onto said seat post, and that is retained in said frame body by said position-limiting portion; and
    a cushion sleeved onto said seat post, and having a tube body that is fittingly disposed between said seat post of said seat post unit and said base portion of said frame body, and a sleeve portion that extends from said tube body, and that is disposed between said post clamp of said seat post unit and said base portion of said frame body.

2. The bicycle frame as claimed in claim 1, wherein said mounting unit further has two side portions respectively extending from two opposite sides of said base portion, and respectively abutting against two opposite sides of said sleeve portion of said cushion for retaining said sleeve portion therebetween.

3. The bicycle frame as claimed in claim 1, wherein:
said sleeve portion of said cushion is formed with amounting groove disposed for receiving said post clamp of said seat post unit; and
said position-limiting portion is snap fitted to a top part of said sleeve portion, and cooperates with said base portion to define a receiving space for receiving said sleeve portion.

4. The bicycle frame as claimed in claim 3, wherein said position-limiting portion of said mounting unit of said frame body is configured as a female snap button, and said sleeve portion of said cushion is configured as a male snap button.

5. The bicycle frame as claimed in claim 1, wherein
said post clamp has a C-shaped portion sleeved onto said seat post, two juxtaposed abutment portions, which respectively extend from two ends of said C-shaped portion and each of which is formed with a threaded hole, and a screw engaging said threaded holes of said abutment portions to fasten said abutment portions together so as to clamp said seat post within said post clamp.

6. The bicycle frame as claimed in claim 5, wherein each of said abutment portions of said post clamp has an open-ended horizontal slot formed in a middle portion thereof.

7. The bicycle frame as claimed in claim 1, wherein:
said sleeve portion has a bottom buffer plate extending from said tube body, disposed between said post clamp of said seat post unit and said base portion of said frame body, and having a flip-up plate portion that is formed with a through hole;
said position-limiting portion of said mounting unit is configured as a vertical plate, extends from said base portion through said through hole of said flip-up plate portion of said bottom buffer plate of said sleeve portion and into said post clamp, and has a fastener hole; and
said post clamp includes a screw extending through said fastener hole of said position-limiting portion of said mounting unit.

8. The bicycle frame as claimed in claim 7, wherein
said post clamp further includes a C-shaped clamp portion sleeved onto said seat post, said screw further extending through two ends of said clamp portion for clamping said seat post within said post clamp, such that the two ends of said clamp portion clamp said position-limiting portion of said mounting unit therebetween.

9. The bicycle frame as claimed in claim 7, wherein:
said mounting unit further has two opposite upright side plate portions respectively extending from two opposite sides of said base portion, and respectively abutting against two opposite sides of said sleeve portion for retaining said sleeve portion between said side plate portions; and
said sleeve portion further has two side buffer plates respectively extending from two opposite sides of said bottom buffer plate, and each being disposed between a respective one of said side plate portions of said frame body and said post clamp.

10. The bicycle frame as claimed in claim 7, wherein said sleeve portion further has a positioning tube portion extending from said bottom buffer plate toward said post clamp, and disposed between said post clamp and said seat post.

* * * * *